United States Patent
Steckel et al.

(10) Patent No.: US 9,212,725 B2
(45) Date of Patent: Dec. 15, 2015

(54) RING GEARS CONFIGURED TO ENCASE IN-LINE TORQUE TRANSDUCERS FOR POWER TOOLS

(75) Inventors: John Paul Steckel, Allentown, PA (US); Daniel Jay Becker, Monroe, NJ (US); Timothy Richard Cooper, Titusville, NJ (US); Gregory Paul Albert, Nazareth, PA (US)

(73) Assignee: Ingersoll-Rand Company, Davidson, NC (US)

( * ) Notice: Subject to any disclaimer, the term of this patent is extended or adjusted under 35 U.S.C. 154(b) by 0 days.

(21) Appl. No.: 14/006,206

(22) PCT Filed: Mar. 31, 2011

(86) PCT No.: PCT/US2011/030653
§ 371 (c)(1),
(2), (4) Date: Sep. 19, 2013

(87) PCT Pub. No.: WO2012/134474
PCT Pub. Date: Oct. 4, 2012

(65) Prior Publication Data
US 2014/0011621 A1     Jan. 9, 2014

(51) Int. Cl.
*F16H 1/28* (2006.01)
*B25B 21/00* (2006.01)
*B25B 23/14* (2006.01)
*B25B 23/147* (2006.01)
*B25F 5/00* (2006.01)

(52) U.S. Cl.
CPC *F16H 1/28* (2013.01); *B25B 21/00* (2013.01); *B25B 23/14* (2013.01); *B25B 23/147* (2013.01); *B25F 5/001* (2013.01)

(58) Field of Classification Search
None
See application file for complete search history.

(56) References Cited

U.S. PATENT DOCUMENTS

| 3,858,444 | A | * | 1/1975 | Wallace | 73/862.21 |
|---|---|---|---|---|---|
| 4,223,555 | A | | 9/1980 | Alexander | |
| 4,281,538 | A | | 8/1981 | Dudek | |
| 4,404,799 | A | * | 9/1983 | Dudek | 60/370 |
| 4,485,682 | A | * | 12/1984 | Stroezel et al. | 73/862.331 |

(Continued)

FOREIGN PATENT DOCUMENTS

| CN | 101091998 A1 | 12/2007 |
|---|---|---|
| CN | 101220859 A | 7/2008 |

(Continued)

OTHER PUBLICATIONS

International Search Report for corresponding PCT Application No. PCT/US2011/030653, Date of mailing Apr. 18, 2012.

(Continued)

*Primary Examiner* — Edwin A Young
(74) *Attorney, Agent, or Firm* — Sunstone IP (57) ABSTRACT

Ring gears with a cylindrical ring gear body having a wall with a longitudinal length extending between opposing first and second ends, the wall having an outer surface and an inner surface. The inner surface has a first portion that extends a first sub-length of the ring gear body and a longitudinally spaced apart second portion that extends a second sub-length of the ring gear body. The first portion extends from the first end of the ring gear inward and the second portion extends from the second end of the ring gear inward. The inner surface of the first portion comprises a plurality of longitudinally extending splines and the inner surface of the second portion is devoid of the splines of the first portion.

19 Claims, 8 Drawing Sheets

(56) References Cited

U.S. PATENT DOCUMENTS

| | | | |
|---|---|---|---|
| 4,487,270 | A | 12/1984 | Huber |
| 4,493,223 | A | 1/1985 | Kishi et al. |
| 4,620,449 | A * | 11/1986 | Borries et al. ............. 73/862.21 |
| 4,710,071 | A | 12/1987 | Koehler et al. |
| 4,809,557 | A | 3/1989 | Maurer et al. |
| 4,996,890 | A | 3/1991 | Taniguchi et al. |
| 5,172,774 | A | 12/1992 | Melrose |
| 5,269,733 | A | 12/1993 | Anthony, III |
| 5,442,965 | A | 8/1995 | Halen |
| 5,780,751 | A * | 7/1998 | Nomerange et al. ..... 73/862.325 |
| 5,897,454 | A | 4/1999 | Cannaliato |
| 6,401,572 | B1 * | 6/2002 | Provost ........................ 81/57.14 |
| 7,021,159 | B2 | 4/2006 | Liu et al. |
| 7,602,137 | B2 | 10/2009 | Du et al. |
| 8,584,359 | B1 * | 11/2013 | Bowman ...................... 29/893.1 |
| 2001/0045135 | A1 | 11/2001 | Horiuchi et al. |
| 2004/0060369 | A1 | 4/2004 | Liu et al. |
| 2006/0117868 | A1 * | 6/2006 | Liu et al. .................. 73/862.045 |
| 2007/0144753 | A1 * | 6/2007 | Miller ........................... 173/217 |
| 2007/0298927 | A1 * | 12/2007 | Hansson ....................... 475/339 |
| 2010/0107824 | A1 * | 5/2010 | Hanspers et al. ............ 81/57.11 |
| 2010/0139432 | A1 | 6/2010 | Steckel et al. |

FOREIGN PATENT DOCUMENTS

| | | | |
|---|---|---|---|
| WO | WO 2008090069 | A1 * | 7/2008 |
| WO | WO 2009005435 | A1 * | 1/2009 |

OTHER PUBLICATIONS

Search Report dated Jan. 6, 2015 from Chinese Patent Application No. 201180069729.9 filed Mar. 31, 2011.

Office Action dated Jan. 15, 2015 from Chinese Patent Application No. 201180069729.9 filed Mar. 31, 2011.

* cited by examiner

RING GEARS CONFIGURED TO ENCASE IN-LINE TORQUE TRANSDUCERS FOR POWER TOOLS

RELATED APPLICATION

This application is a 35 USC §371 national phase application of PCT/US2011/030653, filed Mar. 31, 2011, the contents of which are hereby incorporated by reference as if recited in full herein.

FIELD OF THE INVENTION

This invention relates to power tools and is particularly suitable for cordless power tools.

BACKGROUND OF THE INVENTION

Power tools can be exposed to repetitive operation that can reduce a lifespan of certain components. Power tools typically include torque transducers to monitor rotational torque generated by a drive train. Monitoring torsion in power tools and other rotating machinery is often desirable. In the case of power tools, such as nutrunners or screwdrivers, the monitored data permits measurement of the rotational torque output and thereby calculation of output produced by the tool. Real time feedback coupled with programmable controls makes it possible to automatically adjust tool operation, e.g., deactivate the tool power, such as when a desired fastener tension is achieved. This provides the benefit of reproducible fastener tensioning in precision environments and/or assembly line or other mass production operations. Power tool drive trains are typically limited in space and moving parts can damage transducers.

SUMMARY OF EMBODIMENTS OF THE INVENTION

Embodiments of the invention are directed to ring gears that can protect transducers from premature breakage due to exposure to operational forces.

Embodiments of the invention are directed to ring gear and torque assemblies that can provide accurate torque measurements, protect the transducer from moving parts, and provide for ease of assembly with accurate alignment to position the transducer in concentric alignment with the drive train.

Some embodiments are directed to ring gears that include a cylindrical ring gear body having a wall with a longitudinal length extending between opposing first and second ends. The wall has an outer surface and an inner surface. The inner surface has a first portion that extends a first sub-length of the ring gear body and a longitudinally spaced apart second portion that extends a second sub-length of the ring gear body. The first portion extends from the first end of the ring gear inward and the second portion extends from the second end of the ring gear inward. The inner surface of the first portion includes a plurality of longitudinally extending splines and the inner surface of the second portion is devoid of the splines of the first portion.

The ring gear body inner surface can include a circumferentially extending rim between the first and second portions.

The inner surface of the second portion of the ring gear can include at least one of: (a) longitudinally extending slots; (b) radially inward projecting, longitudinally extending rails; or (c) at least one each of a longitudinally extending slot and a radially inward projecting, longitudinally extending rail.

The second portion sub-length can be less than the first portion sub-length. The second portion can have a smooth inner surface.

The second end of the wall can have a thickness that is greater than the first end.

The second portion has a wall thickness that is greater than the first portion. The wall can have a substantially constant outer diameter.

The inner surface of the second portion of the ring gear can include at least two circumferentially spaced apart longitudinally extending rails that project radially inward.

The inner surface can include a circumferentially extending rim positioned between the first and second portions. The second portion inner surface can include two substantially diametrically opposed longitudinally extending rails that terminate proximate the rim.

The second portion can be sized and configured to hold an outerwall of a disk shaped transducer to be flush or held just inward of the second end of the ring gear.

The first portion can be sized and configured to surround first and second stage gears of a drive train for a power tool and the second portion can be sized and configured to encase an outer wall of a disk shaped transducer.

The ring gear can be in combination with a disk-shaped torque transducer. The disk-shaped torque transducer has a longitudinally extending outer wall with opposing first and second ends and a length therebetween. The outer wall merges radially inward into a thin circular interior flat wall that surrounds a center hub defining an axially extending open channel. The transducer outer wall length is the same or less than the sub-length of the second portion of the ring gear. The transducer outer wall resides encased in the second portion of the ring gear.

The ring gear second portion can include a plurality of longitudinally extending circumferentially spaced apart rails and the transducer outer wall can have a plurality of circumferentially spaced apart slots. The transducer slots can matably engage the ring gear rails so that the transducer is held in a locked anti-rotational configuration with respect to the ring gear.

Yet other embodiments are directed to a power tool. The power tool includes a motor having an outwardly extending rotor that defines a drive axis and a drive train coupled to the rotor and configured to drive a tool output. The drive train includes first and second stage gears and a ring gear with a wall having an inner surface with (i) a first segment having splines that engage the first and second stage gears and (ii) a spaced apart second segment that resides upstream of the first stage gears facing the motor. The power tool also includes a disk-shaped torque transducer having an outer wall that radially merges into a thin flat interior wall having a center hub with an open channel that projects outward toward the motor with a hub center axis that is concentric with the drive axis. The transducer outer wall resides encased inside the ring gear second segment in a locked anti-rotational configuration with respect to the ring gear.

The power tool can be a cordless power tool.

The transducer outer wall can be held substantially flush with an end of the ring gear that faces the motor.

The ring gear can include rails and the transducer outer wall can include cooperating slots that slidably receive the rails to lock the transducer to the ring gear.

The ring gear inner surface can include a circumferentially extending rim positioned between the first and second segments so that the transducer abuts the rim when in position in the ring gear.

The tool can include a gearcase that surrounds the ring gear and a motor mount that holds the motor and attaches to the gearcase. The ring gear is held inside the gearcase between the motor mount and a tapered end of the gearcase to have an axial float clearance on each end of the ring gear so that, during operation, the ring gear floats relative to the gearcase and motor mount.

The transducer center hub can have external gear teeth that merges into a stepped wall portion proximate the thin flat center wall. The motor mount can include a transducer engaging segment with splines and a stepped wall segment. The motor mount splines of the transducer engaging segment engage the hub external gear teeth. The stepped portion of the transducer center hub matably engages the stepped segment of the motor mount to concentrically align the hub center axis with the drive axis. The motor rotor extends through a front portion of the center hub channel and attaches to a pinion that extends out of a rear portion of the center hub channel.

The foregoing and other objects and aspects of the present invention are explained in detail in the specification set forth below.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DESCRIPTION OF EMBODIMENTS OF THE INVENTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. In the drawings, the thickness of lines, layers, features, components and/or regions may be exaggerated for clarity and broken lines illustrate optional features or operations, unless specified otherwise.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when a feature, such as a layer, region or substrate, is referred to as being "on" another feature or element, it can be directly on the other feature or element or intervening features and/or elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected, attached or coupled to the other element or intervening elements may be present. In contrast, when a feature or element is referred to as being "directly connected", "directly attached" or "directly coupled" to another element, there are no intervening elements present. Although described or shown with respect to one embodiment, the features so described or shown can apply to other embodiments.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein.

The term "cordless" power tool refers to power tools that do not require plug-in, hard wired electrical connections to an external power source to operate. Rather, the cordless power tools have electric motors that are powered by on-board batteries, such as rechargeable batteries. A range of batteries may fit a range of cordless tools. Different cordless power tools may have a variety of electrical current demand profiles that operate more efficiently with batteries providing a suitable range of voltages and current capacities. The different cordless (e.g., battery powered) power tools can include, for example, screwdrivers, ratchets, nutrunners, impacts and the like.

Embodiments of the invention may be particularly suitable for precision power tool that can be used for applications where more exact control of the applied output is desired.

Figure 1:
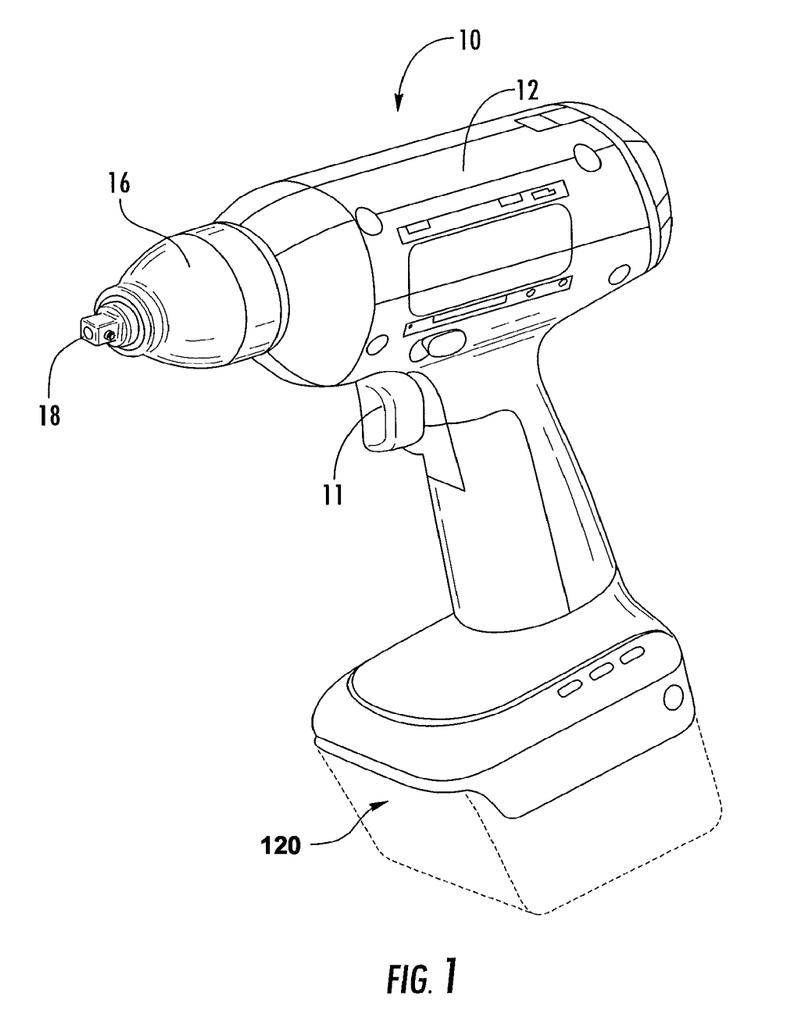
FIG. 1 is a side perspective view of an exemplary cordless power tool according to embodiments of the present invention.
Figure 2:
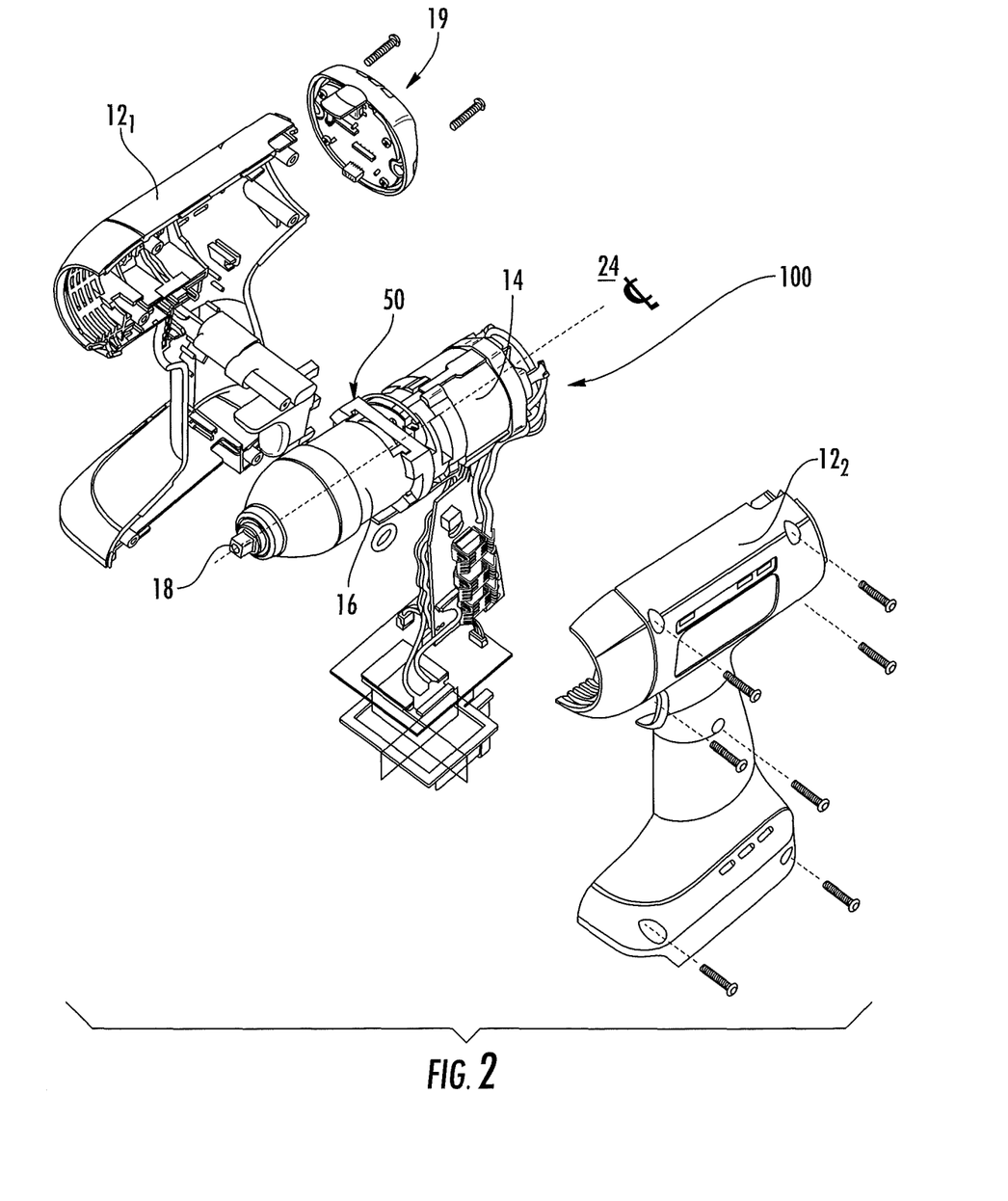
FIG. 2 is an exploded view of the tool shown in FIG. 1.
Figure 3:
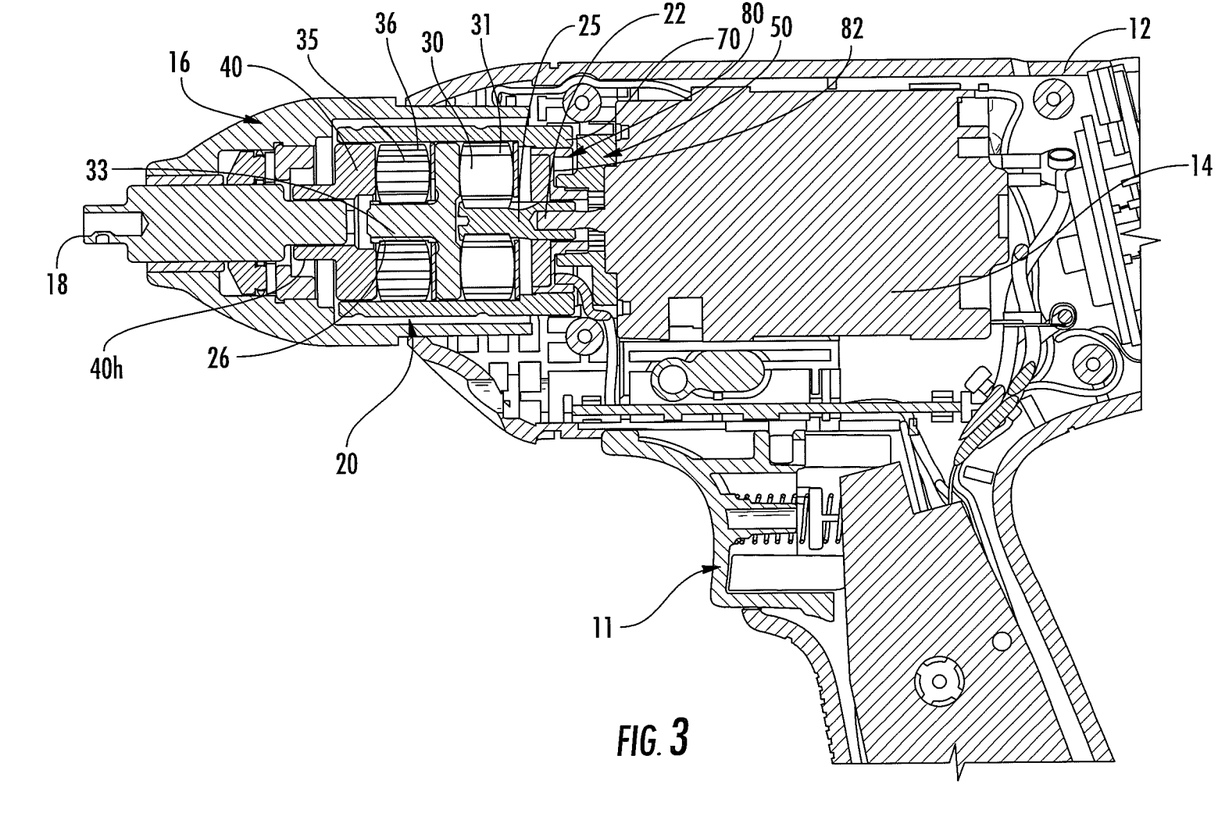
FIG. 3 is a side section view of the power tool shown in FIG. 1 according to embodiments of the present invention.
Figure 4:
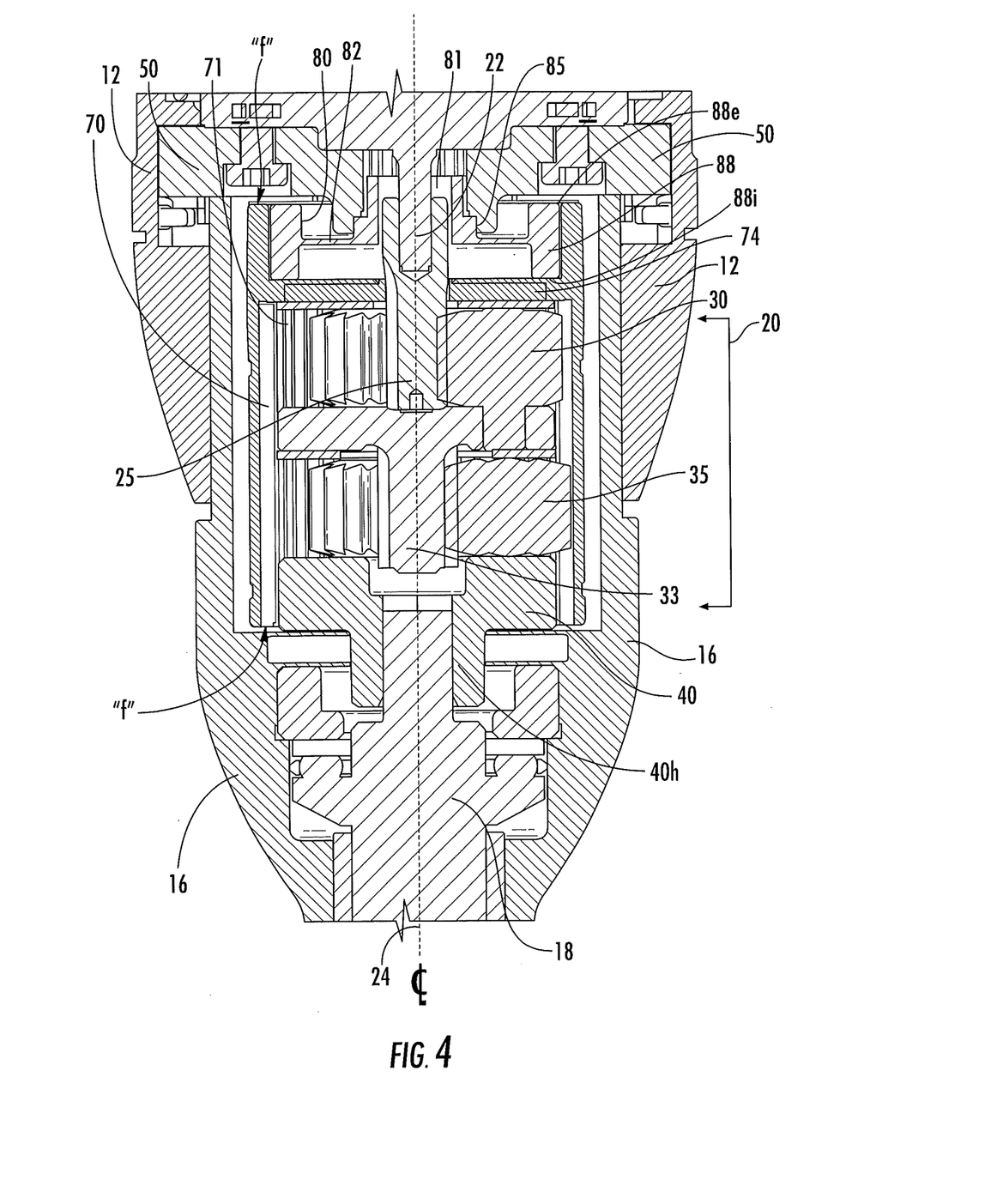
FIG. 4 is a top section view of a portion of the power tool shown in FIG. 1 according to embodiments of the present invention.

FIGS. 1 and 2 illustrate an example of a power tool 10 that includes a housing 12, a motor 14, a gearcase 16 and a tool output shaft 18. As shown, the housing 12 encases the motor 14 and partially surrounds the gearcase 16. The gearcase 16 encloses a drive train 20 (FIGS. 3, 4). The lower portion of the housing can releasably engage a battery 120 (shown in broken line in FIG. 1). The housing can include an external control such as a trigger 11 and a UI (user interface) 19 with a display.

The motor 14 can be held in a desired fixed position and orientation in the housing 12 using a motor mount 50 (FIGS. 2, 3 and 4). The gearcase 16 is rigidly mounted to the motor mount 50 creating a single unified drive train. The motor 14 can attach (e.g., screw) to the motor mount 50. In some embodiments, the gearcase 16 can twist to matably lock to the motor mount 50. The gearcase 16 (and encased drive train 20) with the motor mount 50 and motor 14 can define or form part of a motor sub-assembly 100 that can be placed into the outer housing 12, which as shown in FIG. 2, may be provided as two matable components $12_1$, $12_2$.

Referring to FIGS. 3 and 4, the motor 14 includes a motor rotor 22 (e.g., motor output shaft) 22 that extends toward the tool output shaft 18 and has a centerline that coincides with a drive train center axis 24. The motor rotor 22 is attached to a pinion gear 25 having a plurality of splines or teeth 26. The motor rotor 22 drives the pinion 25 which engages the drive train 20, which thereby drives the tool output shaft 18.

The drive train 20 includes a first stage of planetary gears 30 and a second stage of planetary gears 35 that reside inside a ring gear 70. The ring gear 70 does not itself rotate but defines an outer wall for the planetary gears 30, 35. The ring gear 70 is cylindrical and includes a wall with an inner surface that includes elongate teeth or splines 71. The teeth 31, 36 of the gears 30, 35 can substantially mate with the ring gear splines or teeth 71 as the planetary gears rotate inside the ring gear 70 during operation.

The drive train 20 first stage of planetary gears 30 is typically three planetary gears and the teeth 31 substantially mate with the teeth 26 of the pinion gear 25. The drive train 20 also includes a gearhead 33 with a gear with splines or teeth and a plate (the plate faces the first stage of gears 30). The first stage of gears 30 drives the gearhead 33. The second stage of planetary gears 35 also typically includes three planetary gears with external teeth 36. The gearhead 33 resides downstream of the first stage of gears 30 and drives the second stage of gears 35. Thus, the first stage (e.g., set) of gears 30 orbit about the pinion 25 (see FIGS. 3 and 4) and the second stage (e.g., set) of gears 32 orbit about the output gear of the gearhead 33. In turn, the second stage of gears 35 drive a carrier 40 which drives the tool output shaft 18. A portion of the carrier also resides within the ring gear 70 with a center hub 40h that extends a distance outside the ring gear 70 and holds the tool output shaft 18.

Figure 5A:
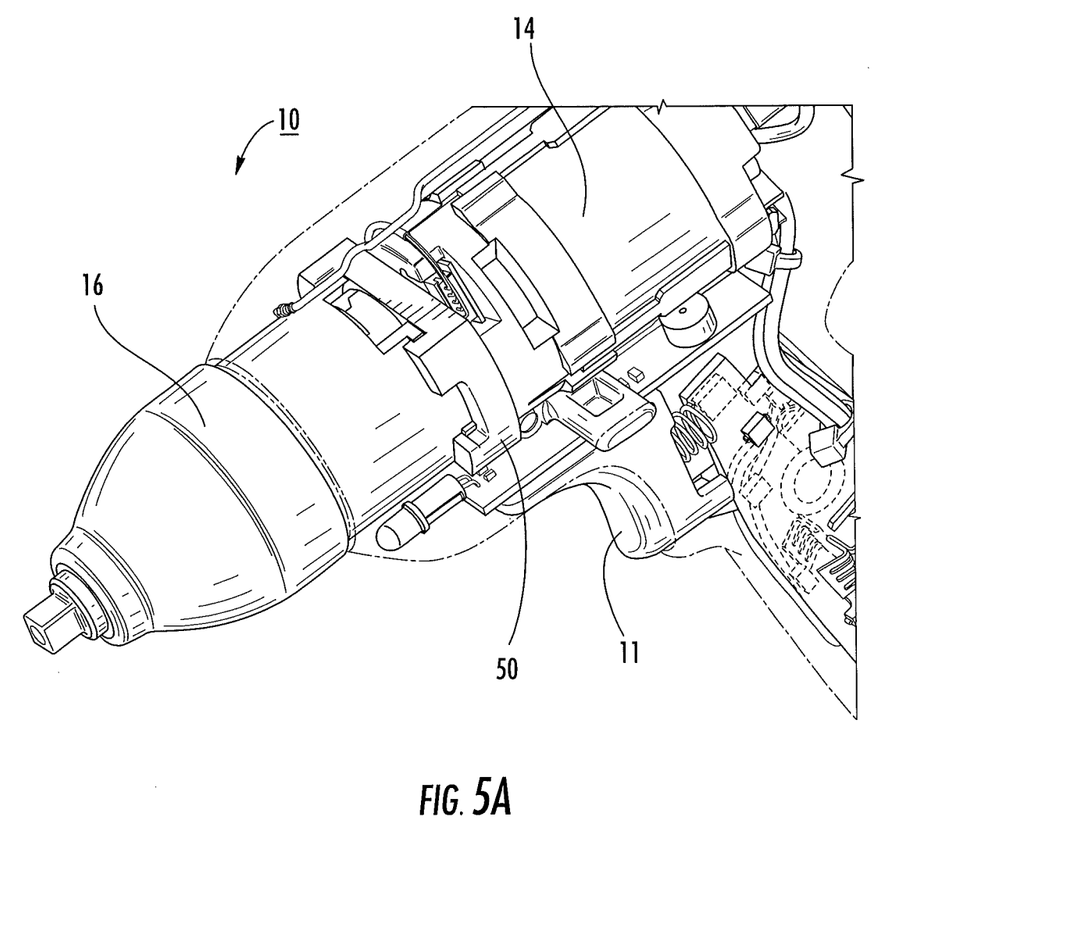
FIG. 5A is a side perspective view of a portion of the tool shown in FIG. 1 with the housing illustrated as a transparent component to illustrate positions of certain features according to embodiments of the present invention.
Figure 5B:
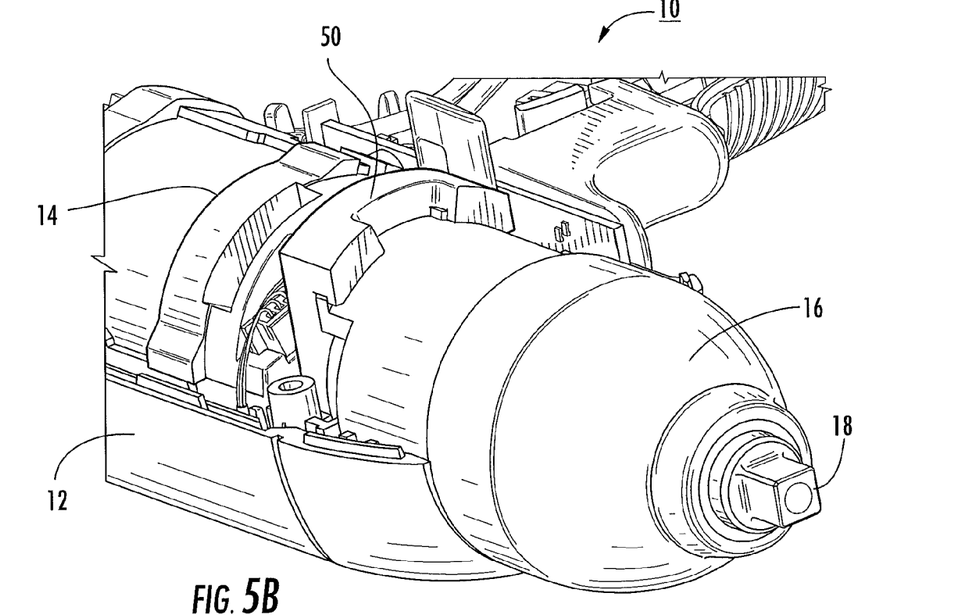
FIG. 5B is a partial end perspective view of the tool shown in FIG. 5A, with a part of the housing omitted.
Figure 5C:
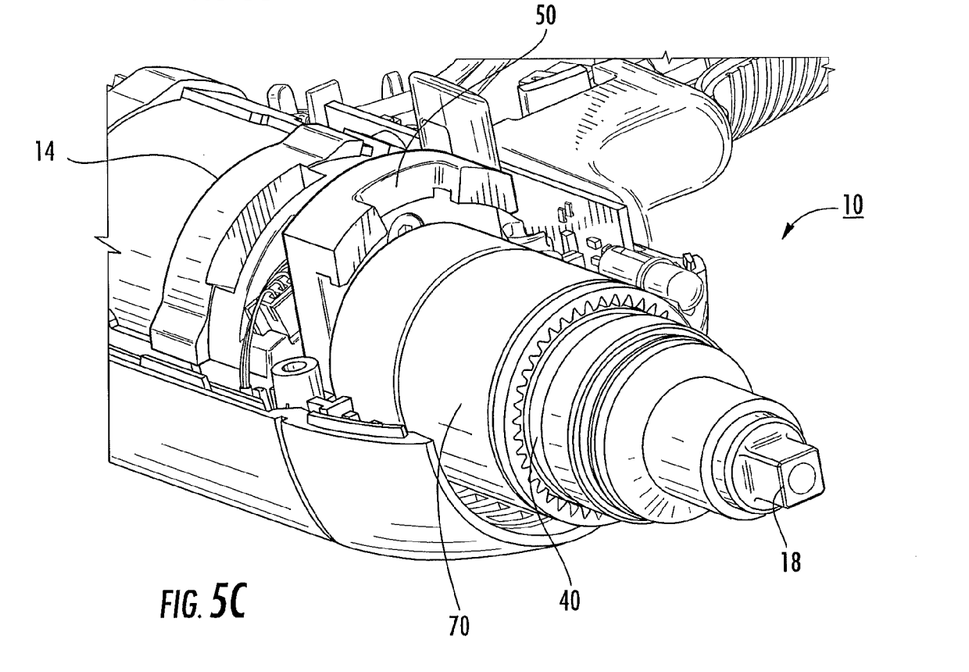
FIG. 5C is a partial end perspective view of the tool shown in FIG. 5B with the gearcase also omitted.

FIG. 5A shows the tool 10 with the gearcase 16 that extends about the exterior of ring gear 70. The gearcase 16 is fixably attached to the motor mount 50. FIG. 5B illustrates the gearcase 16 and one side of the housing $12_1$ with the motor mount 50 and motor 14 while FIG. 5C shows the tool 10 without the gearcase 16 to illustrate the position of the ring gear 70 inside the gearcase 16 and housing 12.

Referring again to FIGS. 3 and 4, a torque transducer 80 is held inside the ring gear 70 at the end facing the motor 14. The torque transducer 80 is typically a disc-shaped torque transducer that is held in-line with the drive axis. The torque transducer 80 can have a thin wall 82. The thin wall 82 is reactive to torque and typically has a wall thickness that is less than about 0.050 inches thick, and more typically between about 0.02 to about 0.002 inches thick. The thin wall 82 defines a web that communicates with sensors such as strain gauges. The transducer 80 can electrically connect to a control circuit (not shown) in the housing 12 via wiring extending through an aperture 83 (FIG. 7).

Figure 6:
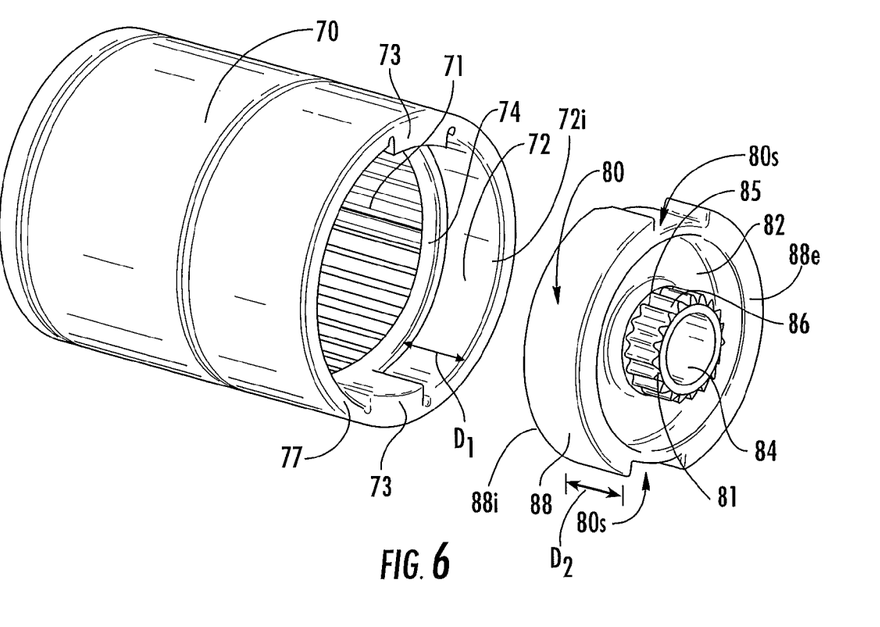
FIG. 6 is a side perspective exploded view of an in-line torque transducer and a ring gear according to embodiments of the present invention.
Figure 7:
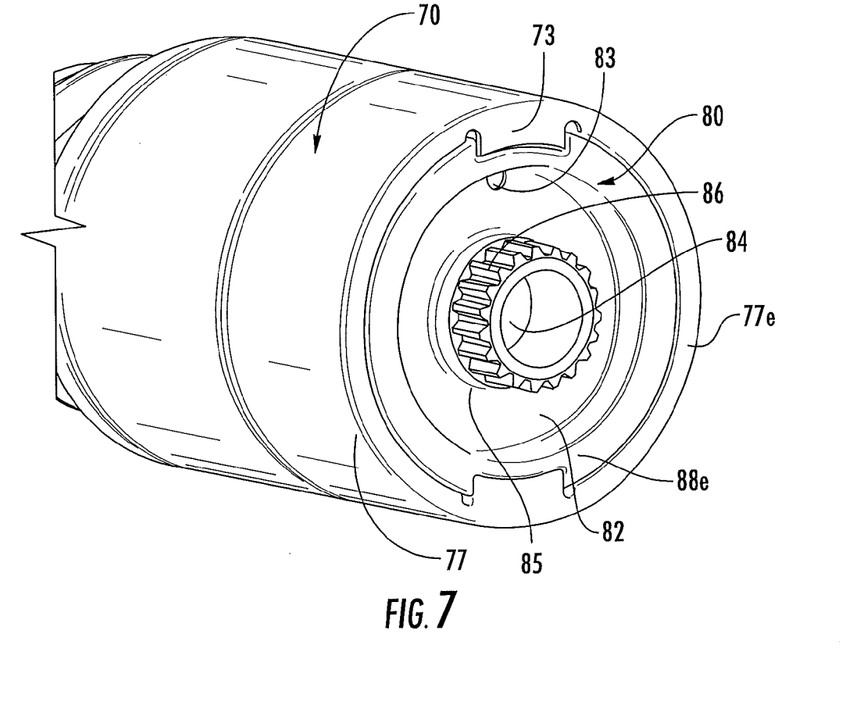
FIG. 7 is side perspective assembled view of the transducer and ring gear shown in FIG. 6 according to embodiments of the present invention.

As shown in FIGS. 6 and 7, the torque transducer 80 includes a center hub 81 that defines a cylinder having a cylindrical open channel 84 that has an axis that is co-linear with the output shaft axis 24 (see FIGS. 2 and 4). The inner surface of the channel can be smooth and receives the pinion gear 25 at the junction of the pinion gear 25 and motor rotor 22 (FIG. 4).

As shown in FIG. 4, the motor rotor 22 extends from the motor 14 into one end of the hub 81 and attaches to the end of the pinion gear 25 inside the hub channel 84. The channel 84 is larger than the motor rotor 22, such that the motor rotor 22 rotates with respect to the housing 12 and the hub 81 is fixed with respect to the housing 12. Typically, the hub 81 includes external teeth 86 that lockably engage mating teeth of the static motor mount 50 (FIG. 4).

Referring to FIGS. 3 and 4, it is noted that in some embodiments, the ring gear 70 has a wall thickness that is greater at one end (the end that encases the transducer outer wall) than at the other end (the end associated with the first and second stage gears). The ring gear 70 can have a substantially constant outer diameter, but may include a relatively thin groove or two. As shown in FIG. 4, the wall thickness of the ring gear 70 can be different on each side of the inner rim 74, with the segment or portion proximate the motor 14 having a wall thickness that is greater than the other portion associated with the splines 71.

The transducer outer wall 88 can merge into the thin center circular (flat) wall 82 (e.g., web). The torque transducer 80 typically includes at least one strain gauge positioned on the thin wall 82 that measures the torque or strain on the torque transducer 80. In some embodiments, multiple strain gauges are utilized, however any suitable number of strain gauges can be utilized to provide accurate strain data. When the measured strain exceeds a set amount, the power tool 10 can be put into neutral or turned off to stop rotation of the output shaft 18. Additional details of an exemplary transducer 80 can be found in U.S. patent application Ser. No. 12/328,035, the contents of which are hereby incorporated by reference as if recited in full herein.

To facilitate proper concentric alignment with the drive axis 24, the transducer hub 81 can include a stepped portion 85 that resides between the thin wall 82 and the teeth 86 to engage a matable stepped portion on the motor mount 50 (see, FIGS. 3 and 4). This with the cooperating locking alignment features of the ring gear 70 and transducer 80 can inhibit any off-center rocking that might occur without proper concentric alignment.

With further reference to FIGS. 6 and 7, the torque transducer 80 has an outer wall 88 that includes at least two diametrically opposed slots or keyways 80s. As will be discussed further below, the slots 80s are sized to matably (snugly) engage a respective rail 73 that projects radially inward a distance toward an axially extending centerline of the ring gear 70 and extends in a longitudinal direction about an inner surface of the ring gear.

The slots or keyways 80s typically have a length sufficient to extend at least a major portion of an overall length of the transducer 80. As shown, the slots 80s extend over the entire length dimension. To be clear, it is noted that the length dimension refers to a dimension that is parallel to the shaft axis 24 (and the axially extending centerline of the cylindrical channel 84).

Figure 8A:
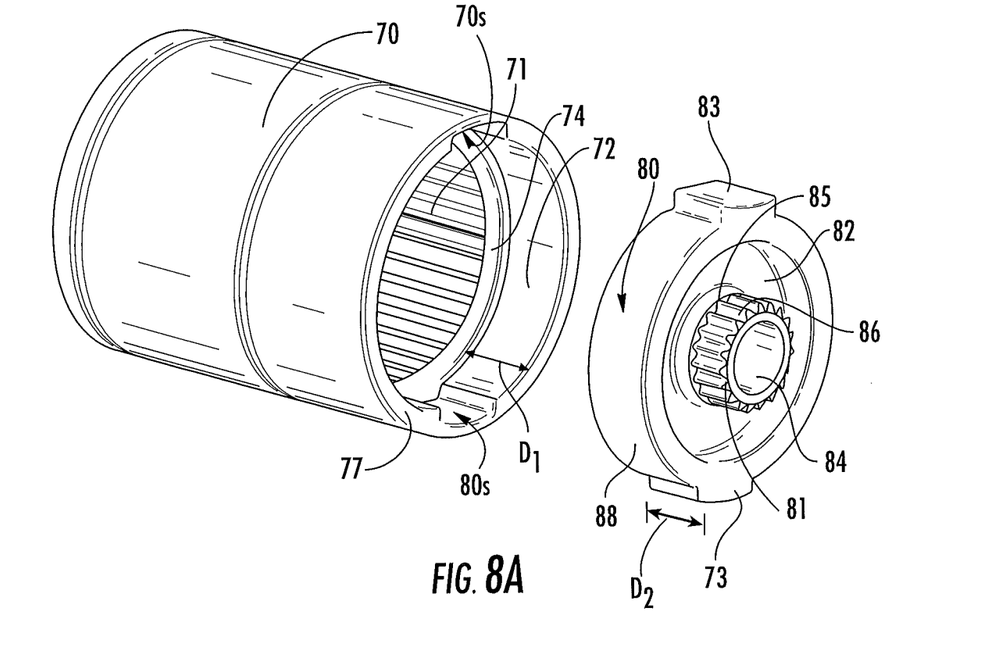
FIG. 8A is a side perspective exploded view of another embodiment of the torque transducer and ring gear according to embodiments of the present invention.
Figure 8B:
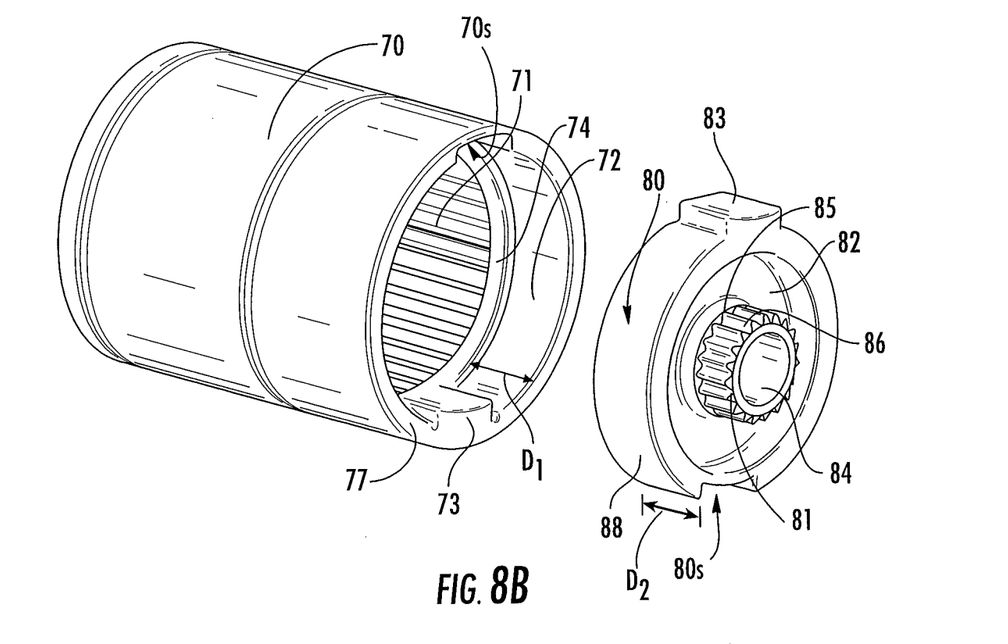
FIG. 8B is a side perspective exploded view of yet another embodiment of the torque transducer and ring gear according to embodiments of the present invention.

The slots 80s can have a constant size in depth and width along their length. Alternatively, one or more of the slots 80s may taper in depth and/or width. Although shown as two diametrically opposed slots 80s, three or more slots may be used and they may be provided in a symmetric or asymmetric spaced apart geometry. Each slot 80s may be the same size or different slots can be sized differently. In addition or alternatively, one slot 80s may extend a partial length distance from a rear edge of the transducer 80 toward the front edge while another 80s may extend from the front edge toward the rear edge (not shown). In other embodiments, as shown in FIG. 8A, the slots 70s may be configured on the ring gear 70 while the longitudinally extending mating rails 83 are on the transducer 80. Alternatively, as shown in FIG. 8B, the ring gear 70 and transducer 80 can include both a slot and a rail to (slidably) matably engage. The term "rail", with respect to the ring gear, refers to a member that projects radially inward from an inner surface of the wall of the ring gear 70 to define a structure that resides in a corresponding transducer slot 80s. The term "rail" with respect to the transducer, refers to a member that projects radially outward from an outer surface of the outerwall of the transducer.

The rails 73 are configured to matably engage the slots 80s as noted above (or rails 83 are configured to matably engage slots 70s). The rails can slidably enter the respective slots during assembly. The rails 73 (83) can extend radially inward a distance that substantially matches the depth of the slots 80s (70s). The rails 73 (or slots 70s, where used) can have a length that substantially extends from the first end of the ring gear to the rim 74 adjacent to the inner end of the splines 71.

The rails 73 may terminate prior to the rim 74. The rails 73 may be configured to extend to the outer first end of the ring gear as shown. Alternatively, the rails may be configured to rise a distance inside the end of the ring gear (perhaps by tapering from a shorter size to a full size rail) a short distance from the outer first end. Different rails can have different sizes, shapes and/or lengths, such as discussed above with respect to the slots. Again, where more than two slots are used, more than two rails may be used. Alternatively two or more side-by-side rails may be configured to matably engage a single slot.

As shown in FIGS. 6 and 7, the ring gear 70 has one end portion 72 that is sized and configured to encase the transducer 80 (except for hub 81). The end portion 72 can be configured to provide a "stop" location that identifies the proper assembly during manufacturing. The inner surface 72i of the wall of the ring gear that encases the transducer can be free of the splines 71 and can be smooth or have a rough surface. In the embodiment shown, the first end (the end without the hub 81) of the transducer 80 can reside against an inner circumferentially extending rim 74 that resides a distance "$D_1$" from the outer edge of the ring gear 70. The distance "$D_1$" substantially corresponds to the (longest) length $D_2$ of the transducer outer wall 88 (is the same or a bit longer). Thus, for example, $D_1$ can have a length that is $D_2$ plus a defined additional length that is typically between about 0 mm to about 0.03 mm, and more typically less than about 0.02 mm. In some embodiments the "$D_1$" distance or length that covers the transducer is about 7 mm (0.275"). The length of the transducer outer wall $D_2$ (the portion except for the splined center hub portion 85 that sticks out) is about 6.98 mm max. So, the transducer outer wall 88 is fully covered (encased by the ring gear wall).

As shown in FIG. 4, the transducer outer wall edge 88i can abut the rim 74. The rim 74 can be a continuous rim that extends about the entire circumference of the inner surface of the ring gear (upstream of the spline 71) or a discontinuous rim. Alternatively, the inner surface of the ring gear can have a circumferentially extending recess that engages a circumferentially extending protruding rim on the transducer to hold the transducer in a desired depth location inside the ring gear (not shown). In other embodiments, the shape of the end portion 72 or snug fit with the outer wall of the transducer body can define the desired fit and stop for the transducer inside the ring gear 70.

As shown in FIG. 4, the ring gear 70 can be mounted inside the gearcase 16 so that it has a floating clearance "f" on each end. In operation, the ring gear 70 can cooperate with the torque transducer 80 to redirect load caused by the ring gear 70 movement to the transducer wall 82. The floating ring gear 70 is rotationally keyed to the transducer 80. For example, when the first and second stage gears 30, 35 experience increased resistance, such as when a fastener has been fully inserted into a workpiece, the first and second stage gears 30, 35 can transfer (some) torque to the ring gear 70. The ring gear 70, in turn, can transfer the torque to the torque transducer 80 via the rails 73 and slots 80s.

The transducer 80 is held inside the outerwall 77 of the ring gear, locked into concentric alignment with the drive train axis 24 using, for example, the slots 80s and mating rails 73 so that the axially extending centerline of the transducer channel 84 is substantially concentric with the centerline of the drive train 24 (FIG. 1, 4). The outer edge 88e of the outerwall 88 of the transducer is held substantially flush with the bounds of the outer edge 77e of the ring gear wall 77. As noted above, typically, the transducer edge 88e is flush to about a minus tolerance fit of about 0.002 inches.

The torque transducer 80 can be a single unitary and/or monolithic body of stainless steel and can be manufactured by metal injection molding. Of course, machining or other processes with sufficient precision may also be used. The ring gear 70 can be a single unitary and/or monolithic body as well, typically comprising a powdered metal steel. Other materials may be used for each of these components and other processes may be used to form the desired shapes and features. In some embodiments, the ring gear 70 can comprise two or more bodies that attach to form the ring gear. For example, the ring gear 70 can have a body formed by a first cylinder associated with the transducer holding portion that can attach to a second cylinder that defines the spline gear portion.

The ring gear 70 can protect the torque transducer 80 from damage from an outside load and can maintain a desired alignment to allow measurement of torsion while inhibiting bending out.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, if used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A ring gear, comprising:
   a cylindrical ring gear body having a wall with opposing first and second ends and a longitudinal length extending therebetween, the wall having a radially outer surface and a radially inner surface,
   wherein the inner surface has a first portion that extends a first sub-length of the ring gear body and a second portion that extends a second sub-length of the ring gear body,
   wherein the inner surface of the wall of the ring gear body comprises a circumferentially extending rim positioned longitudinally between the first and second portions of the inner surface of the wall of the ring gear body and configured to longitudinally space apart the first and second portions,
   wherein the first portion of the inner surface of the wall of the ring gear body extends from the first end of the ring gear body to the circumferentially extending rim and the second portion of the inner surface of the wall of the ring gear body extends from the second end of the ring gear body to the circumferentially extending rim,
   wherein the first portion of the inner surface of the wall of the ring gear body comprises a plurality of longitudinally extending splines and the second portion of the inner surface of the wall of the ring gear body is devoid of the splines, and
   further wherein the second portion of the inner surface of the wall of the ring gear body comprises at least one of: (a) longitudinally extending slots that extend in an axial direction along the second sub-length of the second portion of the inner surface of the wall of the ring gear body from the circumferentially extending rim to the second end of the wall of the ring gear body; (b) radially inward projecting, longitudinally extending rails that extend in an axial direction along the second sub-length of the second portion of the inner surface of the wall of the ring gear body from the circumferentially extending rim to the second end of the wall of the ring gear body; or (c) at least one each of a longitudinally extending slot and a radially-inward projecting, longitudinally extending rail that extend in an axial direction along the second sub-length of the second portion of the inner surface of the wall of the ring gear body from the circumferentially extending rim to the second end of the wall of the ring gear body.

2. The ring gear of claim 1, wherein the second portion sub-length is less than the first portion sub-length.

3. The ring gear of claim 1, wherein the second portion of the inner surface of the wall of the ring gear body has a smooth surface.

4. The ring gear of claim 1, wherein the second end of the wall of the ring gear body has a thickness that is greater than a thickness of the first end of the wall of the ring gear body.

5. The ring gear of claim 1, wherein a portion of the wall corresponding to the second portion of the inner surface of the wall has a wall thickness that is greater than a wall thickness of a portion of the wall corresponding to the first portion of the inner surface of the wall.

6. The ring gear of claim 5, wherein the wall has a substantially constant outer diameter.

7. The ring gear of claim 1, wherein the second portion of the inner surface of the wall of the ring gear body comprises at least two circumferentially spaced apart longitudinally extending rails that project radially inward.

8. The ring gear of claim 1, wherein the second portion of the inner surface of the wall of the ring gear body comprises two substantially diametrically opposed longitudinally extending rails that terminate proximate the circumferentially extending rim.

9. The ring gear of claim 1, wherein the second portion of the inner surface of the wall of the ring gear body is sized and configured to hold an outer wall of a disk-shaped transducer so that the outer wall of the disk shaped transducer is flush and held just inward of the second end of the wall of the ring gear body.

10. The ring gear of claim 1, wherein the first portion of the inner surface of the wall of the ring gear body is sized and configured to surround first and second stage gears of a drive train for a power tool, and wherein the second portion of the inner surface of the wall of the ring gear body is sized and configured to encase an outer wall of a disk-shaped transducer.

11. The ring gear of claim 1, in combination with a disk-shaped torque transducer, wherein the disk-shaped torque transducer has a longitudinally extending outer wall with opposing first and second ends and a length therebetween, wherein the outer wall merges radially inward into a thin circular interior flat wall that surrounds a center hub defining an axially extending open channel, wherein the transducer outer wall length is the same or less than the sub-length of the second portion of the inner surface of the wall of the ring gear body, and wherein the transducer outer wall resides encased in the second portion of the inner surface of the wall of the ring gear body.

12. The ring gear and torque transducer of claim 11, wherein the second portion of the inner surface of the wall of the ring gear body includes the plurality of longitudinally extending circumferentially spaced apart rails, wherein the transducer outer wall has a plurality of circumferentially spaced apart slots, and wherein the transducer slots matably engage the rails of the second portion of the inner surface of the wall of the ring gear body so that the transducer is held in a locked anti-rotational configuration with respect to the ring gear.

13. The ring gear of claim 1, wherein the circumferentially extending rim has a radial thickness greater than a radial thickness of the first and second portions.

14. A power tool, comprising:
   a motor having an outwardly extending rotor that defines a drive axis;
   a drive train coupled to the rotor and configured to drive a tool output, the drive train comprising first and second stage gears and a ring gear,
   wherein the ring gear includes a wall having an inner surface positioned between first and second opposing ends with (i) a first segment having splines that engage the first and second stage gears and (ii) a second segment that resides upstream of the first stage gears facing the motor,
   wherein the ring gear inner surface further comprises a circumferentially extending rim positioned axially between the first and second segments and configured to axially space apart the first and second segments, and
   further wherein the second segment includes at least one of: (a) longitudinally extending slots that extend in an axial direction along the entire second segment of the inner surface of the wall of the ring gear from the circumferentially extending rim to the second end of the wall of the ring gear; (b) radially inward projecting, longitudinally extending rails that extend in an axial direction along the entire second segment of the inner surface of the wall of the ring gear from the circumferentially extending rim to the second end of the wall of the ring gear; or (c) at least one each of a longitudinally extending slot and a radially-inward projecting, longitudinally extending rail that extend in an axial direction along the entire second segment of the inner surface of the wall of the ring gear from the circumferentially extending rim to the second end of the wall of the ring gear; and a disk-shaped torque transducer having an outer wall that radially merges into a thin flat interior wall having a center hub with an open channel that projects outward toward the motor with a hub center axis that is concentric with the drive axis, wherein the transducer outer wall resides encased inside the second segment of the inner surface of the wall of the ring gear in a locked anti-rotational configuration with respect to the ring gear, wherein the transducer abuts the circumferentially extending rim when in position within the ring gear.

15. The tool of claim 14, wherein the power tool is a cordless power tool, and wherein the transducer outer wall, when engaged with the inner surface of the ring gear, is held substantially flush with an end of the ring gear that faces the motor.

16. The tool of claim 14, wherein the inner surface of the ring gear comprises rails and the transducer outer wall comprises cooperating slots that slidably receive the rails of the inner surface of the ring gear to lock the transducer to the ring gear.

17. The tool of claim 14, further comprising a gearcase that surrounds the ring gear and a motor mount that holds the motor and a portion of the motor mount is configured to attach to the gearcase, wherein the ring gear is held inside the gearcase between the motor mount and a tapered end of the gearcase in a positional relationship so as to have an axial float clearance on each end of the ring gear so that, during operation, the ring gear floats relative to the gearcase and motor mount.

18. The tool of claim 17, wherein the transducer center hub has external gear teeth that merge into a stepped wall portion that is proximate to the thin flat center wall that radially merges with the outer wall of the disk-shaped torque transducer, wherein the motor mount comprises a transducer engaging segment with splines and a stepped segment, wherein the motor mount splines of the transducer engaging segment engage the hub external gear teeth and the stepped portion of the center hub matably engages the stepped segment of the motor mount to concentrically align a center axis of the hub with the drive axis, and wherein the motor rotor extends through a front portion of a center channel of the hub and attaches to a pinion that extends out of a rear portion of the center channel of the hub.

19. The tool of claim 14, wherein the circumferentially extending rim has a radial thickness greater than a radial thickness of the first and second segments.

\* \* \* \* \*